US010384397B2

United States Patent
Neitzel et al.

(10) Patent No.: US 10,384,397 B2
(45) Date of Patent: Aug. 20, 2019

(54) METHOD FOR PRODUCING A THERMOPLASTIC FIBER COMPOSITE COMPONENT

(71) Applicant: Premium Aerotec GmbH, Augsburg (DE)

(72) Inventors: Tim Neitzel, Bremen (DE); Jens Bahnsen, Bremen (DE); Angelos Miaris, Bremen (DE); Klaus Edelmann, Ganderkesee (DE)

(73) Assignee: Premium Aerotec Gmbh, Augsburg (DE)

( * ) Notice: Subject to any disclaimer, the term of this patent is extended or adjusted under 35 U.S.C. 154(b) by 46 days.

(21) Appl. No.: 15/459,775

(22) Filed: Mar. 15, 2017

(65) Prior Publication Data
US 2017/0266867 A1    Sep. 21, 2017

(30) Foreign Application Priority Data
Mar. 15, 2016   (DE) .................. 10 2016 003 109

(51) Int. Cl.
*B64C 1/12*    (2006.01)
*B29C 70/54*    (2006.01)
(Continued)

(52) U.S. Cl.
CPC ............ *B29C 65/002* (2013.01); *B29C 70/42* (2013.01); *B29C 70/465* (2013.01);
(Continued)

(58) Field of Classification Search
None
See application file for complete search history.

(56) References Cited

U.S. PATENT DOCUMENTS 8,771,575 B2    7/2014 Dequine
2002/0038687 A1    4/2002 Anderson et al.
(Continued)

FOREIGN PATENT DOCUMENTS

DE    19738388    2/1998
DE    102010040931    3/2012
(Continued)

OTHER PUBLICATIONS

Machine translation of DE 102010040931 (Year: 2012).*
Search Report from corresponding French application No. FR3048916, dated Feb. 11, 2019.

*Primary Examiner* — Barbara J Musser
(74) *Attorney, Agent, or Firm* — Greer, Burns & Crain, Ltd.

(57) ABSTRACT

A method for producing a thermoplastic fiber composite component, in particular for an aircraft or spacecraft, has the following method steps: material-removing processing of a first face of a first plate, wherein the first plate comprises a thermoplastic fiber composite material and a local reduction in thickness of the first plate is made by the material-removing processing of the first face; positioning a second plate relative to the first plate such that the first face of the first plate is brought into alignment with a third face of the second plate; and joining the first plate to the second plate to form a single component, wherein the surface of the first face of the first plate is integrally bonded to the surface of the third face of the second plate.

15 Claims, 4 Drawing Sheets

(51) Int. Cl.
  B29C 65/00   (2006.01)
  B32B 3/26    (2006.01)
  C23F 11/00   (2006.01)
  B29C 70/42   (2006.01)
  B29C 70/46   (2006.01)
  B29L 31/30   (2006.01)
  B29C 65/02   (2006.01)
  B29C 70/16   (2006.01)

(52) U.S. Cl.
  CPC ........... *B29C 70/545* (2013.01); *B32B 3/263* (2013.01); *B64C 1/12* (2013.01); *C23F 11/00* (2013.01); *B29C 65/02* (2013.01); *B29C 66/0246* (2013.01); *B29C 66/02241* (2013.01); *B29C 66/02245* (2013.01); *B29C 66/1286* (2013.01); *B29C 66/12841* (2013.01); *B29C 66/43421* (2013.01); *B29C 66/7212* (2013.01); *B29C 66/72326* (2013.01); *B29C 66/73921* (2013.01); *B29C 70/16* (2013.01); *B29L 2031/3076* (2013.01); *Y02T 50/43* (2013.01)

(56) References Cited

U.S. PATENT DOCUMENTS

| | | |
|---|---|---|
| 2011/0020130 A1 | 1/2011 | Murakami et al. |
| 2012/0040169 A1* | 2/2012 | Boursier ............... B32B 5/022 428/223 |
| 2012/0049702 A1* | 3/2012 | DiFonzo ............... B29C 53/562 312/223.2 |
| 2016/0375630 A1* | 12/2016 | Heltsch ............... B29C 65/16 156/73.1 |

FOREIGN PATENT DOCUMENTS

| | | |
|---|---|---|
| DE | 102013202046 | 8/2014 |
| EP | 2270337 A1 | 1/2011 |

* cited by examiner

METHOD FOR PRODUCING A THERMOPLASTIC FIBER COMPOSITE COMPONENT

CROSS-REFERENCES TO RELATED APPLICATIONS

This application claims the benefit of the German patent application No. 10 2016 003 109.3 filed on Mar. 15, 2016, the entire disclosures of which are incorporated herein by way of reference.

FIELD OF THE INVENTION

The present invention relates to a method for producing a thermoplastic fiber composite component and to a thermoplastic fiber composite component.

Although the present invention and the problem on which it is based can be applied to any desired thermoplastic fiber composite components, they will be described in greater detail with reference to thermoplastic fiber composite components of an aircraft or spacecraft.

BACKGROUND OF THE INVENTION

During finishing, thermoplastic fiber composite components are usually produced by semi-finished products, which are available in the form of sheet material, being deformed or pressed. Pressing thermoplastic laminates is known, for example, from U.S. Pat. No. 8,771,575 B2.

Another approach provides for the thermoplastic fiber composite component to be constructed from a plurality of individual semi-finished products, known as tapes, which are laid as required in order to produce a thermoplastic fiber composite component. This type of production, which is also referred to as tape laying, is described for example in DE 10 2013 202 046 A1.

In addition, another approach provides what are referred to as thickness-adaptive semi-finished products, which comprise intermediate layers made of a thermoplastic material that is not reinforced and is thus deformable in thickness when the semi-finished product is deformed. A semi-finished product of this type is disclosed for example in DE 197 38 388 A1.

SUMMARY OF THE INVENTION

One idea of the present invention is to provide an improved method for producing a thermoplastic fiber composite component and an improved thermoplastic fiber composite component.

There is accordingly provided:

a method for producing a thermoplastic fiber composite component, in particular for an aircraft or spacecraft, comprising the following method steps: material-removing processing of a first face of a first plate, the first plate comprising a thermoplastic fiber composite material and a local reduction in thickness of the first plate being made by the material-removing processing of the first face; positioning a second plate relative to the first plate such that the first face of the first plate is brought into alignment with a third face of the second plate; and joining the first plate to the second plate to form a single component, the surface of the first face of the first plate being integrally bonded to the surface of the third face of the second plate.

a thermoplastic fiber composite component for an aircraft or spacecraft, produced according to a method according to the invention.

A concept on which the present invention is based comprises joining two plates together in order to produce a fiber composite component, at least one of the plates being processed in a material-removing manner at the face to be joined prior to the joining process in order to adjust the thickness of the subsequent component. Allowance for a change in thickness according to the invention is made on the assembled inner surfaces of the plates.

In this manner, material-removing processing of outer surfaces of the subsequent component, which is required, for example, for machining the outside of a plate or a component, is advantageously avoided. This is advantageous in terms of structural mechanics since outer fiber layers thus remain intact, which improves the mechanical material properties in many applications.

Moreover, the production process is advantageously simplified according to the invention since absolutely no milled edges or the like come into direct contact with a (hot) pressing tool, but are merely located inside the component. Undesired turning of individual layers is thus prevented, for example.

Moreover, in spite of the thickness adjustment, a visually appealing, smooth outer surface of the component is advantageously produced with comparatively low production costs, in particular without intermediate consolidation.

In addition, according to the invention, any outer cover layers already provided on the semi-finished product, for example glass layers, advantageously remain intact, which contributes to improved protection of surrounding metal components against corrosion.

In addition, the present invention simplifies the organizational effort in the production since forming families and modifying components is made significantly easier by the simple adjustment of local thicknesses.

In addition, in the case of an aircraft or spacecraft, the invention is transferable to the very large range of components of the aircraft or spacecraft, and therefore a high potential for saving weight is provided by the simplified thickness adjustment.

The plates may, in particular, be consolidated semi-finished products.

The material-removing processing may be a machining process, for example. In particular, it may be machining by means of milling. Alternatively or additionally, separating processes of a different nature are, however, also conceivable for the material-removing processing, for example different types of beam cutting such as laser beam cutting or electron beam cutting, or the like.

The joining can be an areal joining, in particular over the entire component surface of the fiber composite component. It is also possible to insert a connection portion known as a patch between the two plates in order to strengthen the integral bond prior to the joining process, which connection portion is then embedded in the integral bond during the joining process.

According to a further development of the method, the first plate comprises at least one first fiber layer, some of which is removed during the material-removing processing. Different layer structures can thus advantageously be produced within the component, which structures are adapted to the desired change in thickness of the component. In this case, the second plate can either be left with its constant thickness or, similarly to the first plate, be processed in a material-removing manner or machined on the third face, some of an originally continuous fiber layer being likewise removed.

According to one embodiment, the first plate comprises a first cover layer which is arranged on a second face opposite the first face and remains intact during the material-removing processing and/or during the joining process. The cover layer may be a glass layer, for example, which protects surrounding components made of metal, for example aluminum, against corrosion. The original protection of the plate against corrosion, which would no longer be present in the case of the outside of a component being machined by removing the cover layer, for example, is thus advantageously maintained.

According to one embodiment, the second plate comprises a thermoplastic fiber composite material and a second cover layer which is arranged on a fourth face opposite the third face. The second plate can therefore advantageously be designed so as to be symmetrical to the first plate and therefore the fiber layers and/or the cover layers of the component produced using the plates can be formed so as to be symmetrical with respect to a center line of a component contour. In addition, a layer, in particular a glass layer, which contributes, for example, to the protection of surrounding metal components against corrosion, is also provided on a second outer face of the component by means of the second cover layer.

According to one embodiment, the step of joining the plates into a single component comprises the step of pressing. Depending on the selection of material of the thermoplastic matrix of the plates, the pressing process can also comprise a heat treatment that is adapted to the material. Cavities which result from processing the first face (and optionally of the third face) in a material-removing manner, in particular by deformation of the first and/or second plate, are advantageously closed by means of the pressing process.

According to one development, the portion of the first plate processed in a material-removing manner is deformed during the pressing process and integrally bonded to the third face of the second plate. In this way, a fully bonded fiber composite component is advantageously produced. If the second plate is also processed in a material-removing manner, the portion of the second plate processed in a material-removing manner can be deformed during the pressing process in the same way as the first plate. In this case, the portion of the second plate processed in a material-removing manner is either integrally bonded to the portion of the first plate processed in a material-removing manner or to another portion of the first face of the first plate. Furthermore, if no portion processed in a material-removing manner is provided on the second plate, it is also possible to deform, together with the portion of the first plate processed in a material-removing manner, a portion of the second plate aligned with the portion of the first plate processed in a material-removing manner. The cover layer of the relevant deformed plate is always deformed together therewith and remains intact in the process.

According to one embodiment, the first plate and the second plate are each provided with a plurality of fiber layers. Advantageously, the method according to the invention thus permits a wide range of variations of the layer structure. For example, one possibility may be differently oriented fiber layers.

According to one embodiment, the second plate is provided with a constant thickness. In this case, the thickness is, in particular, continuously constant. In this case, the second plate is not machined or is not processed in a material-removing manner on the third face. Advantageously, only one processing step is thus required. During the pressing process, the first face of the first plate and the portion of the first plate that has been processed in a material-removing manner is then integrally bonded to the unmachined third face of the second plate. In this case, in the arrangement in the tool, the upper surface of a lower plate or the lower surface of an upper plate can be the processed first face.

According to one embodiment, the third face of the second plate is processed in a material-removing manner in order to locally reduce a thickness of the second plate prior to the positioning process. Symmetry in the layer structure of the first and the second plate can thus be achieved. A design other than a symmetrical design is also possible. The second cover layer remains intact during the material-removing processing of the third face.

According to one embodiment, the thickness of the second plate is reduced symmetrically to the first plate. For this purpose, the reduction in thickness of the second plate can be provided so as to be a mirror image of the reduction in thickness of the first plate, i.e., symmetrically to a center line between the first and the second plate. A layer structure can thus be achieved in the component to be produced that is symmetrical with respect to a center line of the component contour. A component contour that is symmetrical with respect to the center line would also be conceivable.

According to one embodiment, the fiber layers and the cover layers of the plates are deformed during the pressing process into an arrangement that is at least mostly symmetrical with respect to a center line of a component contour. In this case, an at least mostly symmetrical deformation is to be understood to be a symmetry at least at those portions on which there is no transition region in which the thickness changes. In relation to the thickness, constantly or evenly modified and unchanged portions are accordingly symmetrical with respect to a center line. In contrast, portions of varying thickness can be provided with an unsymmetrical design. However, the portions of varying thickness can also be symmetrical, in particular in the event that the two plates are previously machined in a symmetrical manner.

According to another embodiment of a fiber composite component, a first cover layer is arranged on a first outer face of the fiber composite component. A second cover layer is arranged on a second outer face of the fiber composite component. Moreover, a partially continuous fiber layer is arranged between the first and second cover layer. A local change in thickness and also a local change in the layer structure of the component can thus be advantageously provided.

According to one embodiment, the thermoplastic fiber composite component comprises at least one first continuous fiber layer and one second continuous fiber layer. The partially continuous fiber layer can be arranged between the first continuous fiber layer and the second continuous fiber layer. Despite the change in thickness and the change in the number of layers, continuous fiber layers are thus advantageously provided in an outer region of the component, which is advantageous in terms of structural mechanics.

According to one development, the first continuous fiber layer and the second continuous fiber layer, as well as the first cover layer and the second cover layer, extend at least mostly symmetrically with respect to a center line of the component contour. In this case, an at least mostly symmetrical extension is to be understood to be a symmetry at least at those portions on which there is no change in the progression of the thickness. Advantageously, a symmetrical or at least mostly symmetrical design of this type is advantageous in terms of structural mechanics.

The above embodiments and developments can be combined with one another in any desired manner, where appropriate. In particular, all of the features of the method for producing a thermoplastic fiber composite component can be applied to a thermoplastic fiber composite component and vice versa.

Further possible embodiments, developments and implementations of the invention also include combinations not explicitly mentioned of features of the invention described above or in the following in relation to the embodiments. In particular, a person skilled in the art will also add individual aspects as improvements or supplements to the respective basic forms of the present invention.

BRIEF DESCRIPTION OF THE DRAWINGS

The invention will be explained in greater detail in the following on the basis of embodiments and with reference to the accompanying drawings. The elements of the drawings are not necessarily to scale.

In the drawings.

In the drawings, the same reference numerals denote like or functionally like components, unless stated otherwise.

DETAILED DESCRIPTION OF THE PREFERRED EMBODIMENTS

Figure 1A:
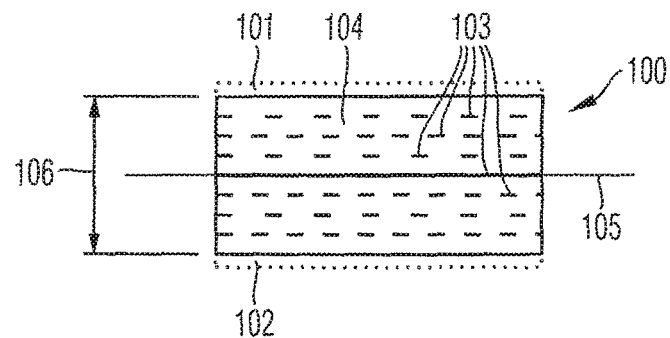
FIG. 1A is a schematic drawing of a plate.

FIG. 1A is a schematic drawing of a plate which comprises a glass layer 101, 102 on each of the surfaces thereof. The plate 100 comprises a plurality of fiber layers 103, for example made of carbon fibers, and a thermoplastic matrix 104. The carbon fibers 103 are arranged symmetrically with respect to a component center line 105.

Figure 1B:
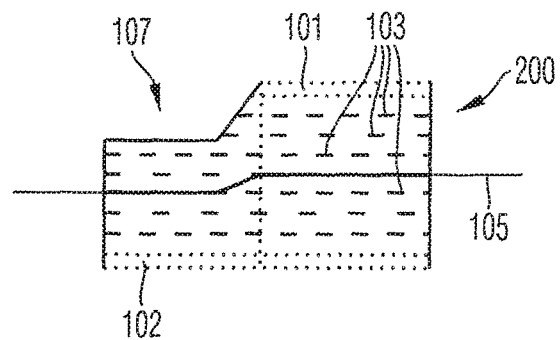
FIG. 1B is a schematic drawing of a machined component.

FIG. 1B is a schematic drawing of a machined component 200. The component is a fiber composite component which is produced from the plate 100.

For the production process, a local reduction in thickness 106 and in the number of fiber layers 103 is made by external machining. For this purpose, material is removed from one of the outer faces, here, by way of example, on the upper face. The material can be removed by means of milling, for example.

In this way, the thickness and the number of fiber layers of the component 200 are locally reduced. In the process, however, some of a glass layer 101 on the machined surface of the component 200 is also removed.

In this case, the fiber orientation is maintained in its original form. Only fiber layers 103 close to the surface are removed in part. The orientation of the fiber layers 103 and the glass layer 101, 102 is thus asymmetric with respect to a center line 105 of the component contour in the machined portion 107.

Figure 2A:
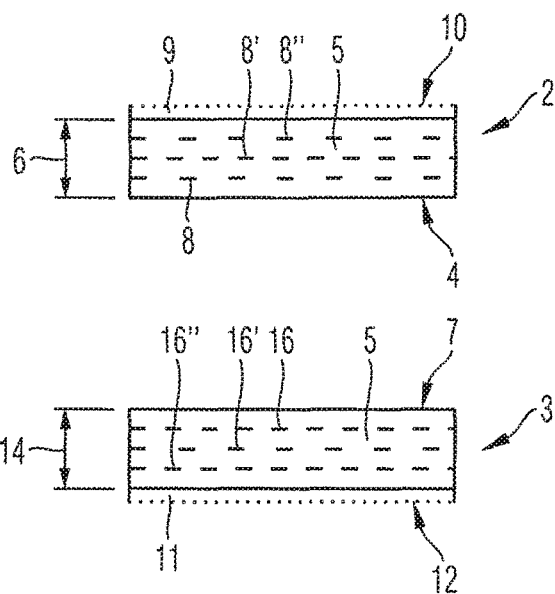
FIG. 2A is a schematic drawing of two plates.

FIG. 2A is a schematic drawing of two plates 2, 3.

A first plate 2 comprises a first face 4 and a second face 10. A thickness 6 of the first plate 2 is initially continuously constant.

The first plate 2 comprises a first cover layer 9 on the second face 10 thereof, which cover layer can be designed as a glass layer that protects against corrosion. The first plate 2 further comprises a fiber composite material 5 which is also present on the first face 4 without a cover layer. Plates of this kind are marketed, for example, by the company TenCate under the name "Cetex®."

The fiber composite material 5 contains fiber layers 8, 8', 8" and a thermoplastic matrix in which the fiber layers 8, 8', 8" are embedded. The drawing of the fiber layers 8, 8', 8" is to be understood as purely illustrative. The fiber layers can be a plurality of differently oriented fiber layers, for example one fiber layer oriented at −45°, one at +45°, one at 90° and one at 0°. Another number and/or orientation of fiber layers may also be provided.

The second plate 3 comprises a third face 7 and a fourth face 12. The second plate is formed so as to have a thickness 14 which is also continuously constant.

The second plate 3 comprises a second cover layer 11 on the fourth face 12 thereof, which cover layer can be designed as a glass layer that protects against corrosion, for example. In addition, the second plate 3 also comprises a fiber composite material 5 which has fiber layers 16, 16', 16" embedded in a thermoplastic matrix in the same way as the first plate 2.

In the embodiment shown, purely by way of example, the first plate 2 and the second plate 3 are of identical design and are arranged in a mirror image to one another. In further embodiments, the second plate 3 can, however, also have a shape that is different from the first plate 1, for example a different, in particular, larger or smaller, thickness 14, a different number of fiber layers 16, 16', 16", etc., no cover layer or another type of cover layer 12, a longer or shorter length or other differentiating features, combinations of differentiating features also being possible.

The plates 2, 3 are consolidated semi-finished products.

Figure 2B:
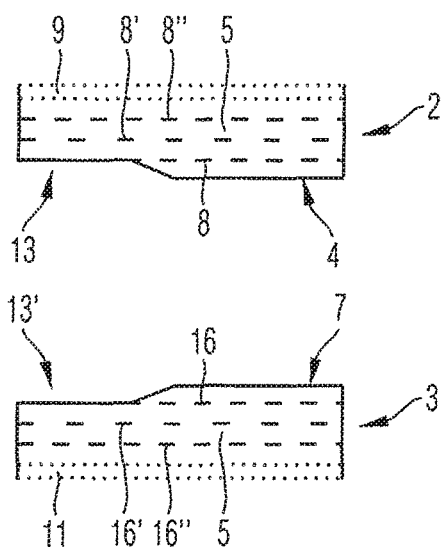
FIG. 2B shows the plates according to FIG. 2A after a machining process.

FIG. 2B shows the plates 2,3 according to FIG. 2A after a machining process. The machining process is a material removal which produces a portion 13, 13' that has been processed in a material-removing manner.

The portion 13 processed in a material-removing manner extends on the first plate 2 so far into the fiber composite material 5 that some of a first fiber layer 8 located close to the first face 4 is also removed. The additional fiber layers 8', 8" and the first cover layer 9 remain intact.

In a manner symmetrical thereto, the portion 13' processed in a material removing manner extends on the second plate 3 so far into the fiber composite material 5 thereof that some of a fiber layer 16 located close to the third face 7 is removed, the remaining fiber layers 16', 16" and the second cover layer 11 remaining intact.

Figure 2C:
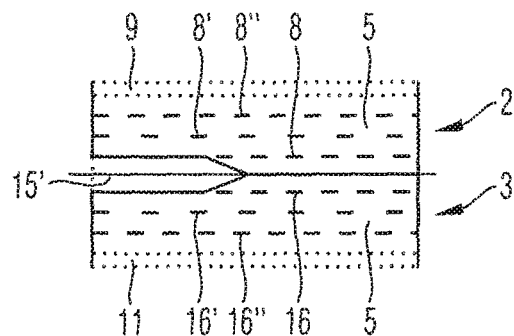
FIG. 2C shows the plates according to FIG. 2B after a positioning process.

FIG. 2C shows the plates according to FIG. 2B after a positioning process. During the positioning process, the plates 2, 3 are arranged such that the first face 4 is in alignment with the third face 7.

In the embodiment shown, in which the plates are symmetrical and symmetrically processed in a material-removing manner, unprocessed portions of the first face 4 and the third face 7 lie directly one on top of the other.

In addition, in the embodiment shown, the portions 13, 13' of the first plate 2 and of the second plate 3 processed in a material-removing manner are arranged in mutual alignment such that, overall, the plates 2, 3 are arranged symmetrically with respect to a drawn imaginary center line 15'.

In other embodiments in which the plates are not symmetrical or are not symmetrically processed, the symmetry of this arrangement can differ. However, after the positioning process, the first face 4 is in alignment with the third face 7, even in the case of differently designed or differently processed plates.

Figure 2D:
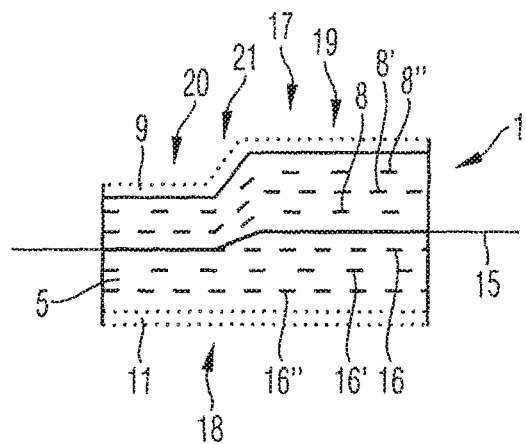
FIG. 2D shows a fiber composite component joined by pressing the plates according to FIG. 2C.

FIG. 2D shows a component 1 joined by pressing the plates 2, 3 according to FIG. 2C.

During the step of pressing, which can optionally include an upstream, downstream or simultaneous heat treatment adapted for the thermoplastics material used for the matrix, the first face 4 and the third face 7 of the plates 2, 3 are integrally bonded to one another. In addition, the portion 13 of the first plate 2 processed in a material-removing manner is deformed during the pressing process and integrally bonded to the third face 7 of the second plate 3.

In the embodiment shown here, the portion 13 of the first plate 2 processed in a material-removing manner is integrally bonded to the third face 7 in the region of the opposite portion 13' of the second plate 3 processed in a material-removing manner, such that the two portions 13, 13' processed in a material-removing manner are joined together so as to be flush.

The resulting component 1 then has a fiber orientation of the fiber layers 8, 8', 8" and 16, 16', 16" which extends symmetrically with respect to a center line 15 of the component contour in a first region 19 in which no change is made in the thickness of the plates and in a second region 20 in which a constant change is made in the thickness of the plates.

In a transition portion 21 in which the progression of the thickness changes, the fiber orientation is symmetrical with respect to the center line 15.

In other embodiments, asymmetry may also occur on account of the fact that, prior to the pressing process, the thickness 6, 14 of the respective plates 2, 3 changes in order to adjust between a portion of which the thickness has been changed by the material removal and a portion of which the thickness has not been changed. However, the fiber orientation overall is always at least mostly symmetrical with respect to the center line 15 of the component contour.

A first outer face 17 of the component 1 thus comprises a transition region 21 that is visible from the outside and at which the thickness of the component changes. In contrast, a second outer face 18 is formed so as to be smooth.

In another embodiment, it would also be conceivable, however, to similarly deform the portions 13, 13' of the first plate 2 and of the second plate 3 processed in a material-removing manner such that the portions meet in a component center or on a center line 15 of the component contour and are integrally bonded to one another. In this case, an ideal symmetry of the fiber layers with respect to a center line 15 would be made possible.

In yet another embodiment in which only the first plate 2 is provided with a portion 13 processed in a material-removing manner and the second plate 3 is not processed in a material-removing manner, the fiber orientation is provided in a similar manner, all of the fiber layers 16, 16', 16" of the second plate 3, however, remaining continuous and thus the first fiber layer 8 and the other fiber layers 8', 8" and the cover layer 9 of the first plate 2 bending to a lesser extent.

In this case, too, the difference in thickness can be compensated either by a deformation of the portion 13 of the first plate 2 processed in a material-removing manner or additionally also by simultaneous opposing deformation of the region of the second plate 3 that is in alignment therewith.

Figure 3:
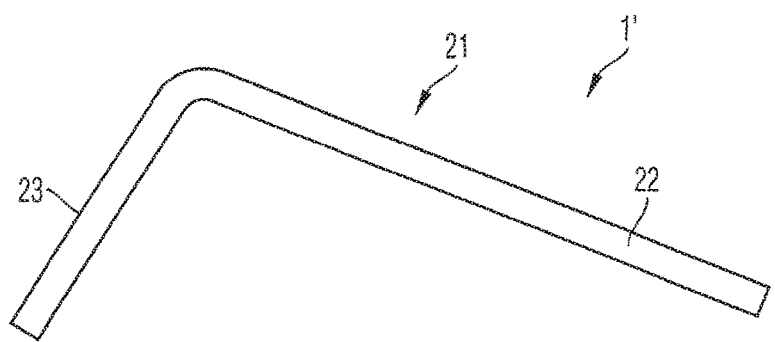
FIG. 3 is a side view of a fiber composite component of an aircraft or spacecraft.

FIG. 3 is a side view of a fiber composite component 1' of an aircraft or spacecraft. The component is an L-shaped clip which connects a frame to a skin, for example.

The L-shaped clip comprises a longer arm 22 and a shorter arm 23. In the region of the longer arm 22, the clip has a transition portion 21 at which the thickness of the component contour changes.

In order to produce a clip of this kind, two plates are arranged in the way described with reference to FIG. 2A to 2D, processed in a material-removing manner, positioned relative to one another, pressed together to form the clip and joined in the process. During the pressing process, in addition to joining the first and second plates, a deformation is carried out in order to bend the shorter arm 23 towards the longer arm 22 such that the L-shape is produced.

An L-shaped clip is thus provided which has a change in thickness in the progression thereof and comprises completely continuously intact outer cover layers, in particular glass layers that protect surrounding metal components against corrosion.

Figure 4:
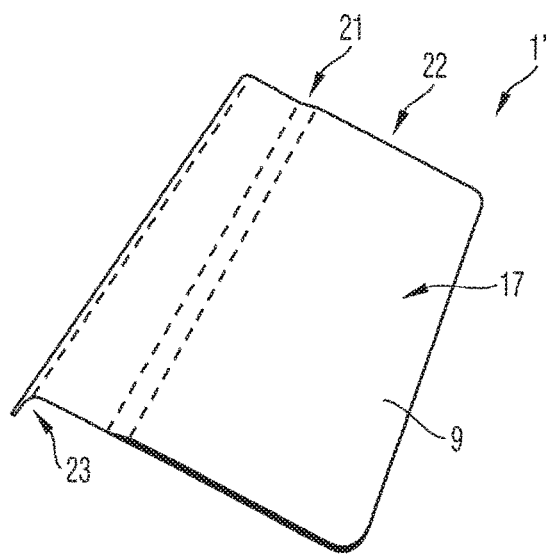
FIG. 4 is a perspective view of the fiber composite component according to FIG. 3.

FIG. 4 is a perspective view of the fiber composite component 1' according to FIG. 3.

A change in contour on the surface is indicated here by dashed lines in each case. In this case, the change in contour is on an outer face 17 opposite the bend of the shorter arm 23, which outer face is covered completely by the cover layer 9.

Although the present invention has been described in this document on the basis of exemplary embodiments, it is not limited to these embodiments, but can be modified in various ways.

For example, the material-removing processing of the plates does not necessarily need to be carried out by machining. In addition, optionally or additionally, correspondingly suitable separating processes would also be conceivable, for example using laser beam cutting, electron beam cutting, water jet cutting or the like.

In addition, the method can also be used on plates without a cover layer. Moreover, cover layers of a different nature may also be provided, for example cover layers designed as a fiber layer.

In place of an L-shaped clip, any other fiber composite components, in particular also more complex components, may also be produced by the method according to the invention.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for producing a thermoplastic fiber composite component, comprising the following method steps:
    material-removing processing of a first face of a first plate, wherein the first plate comprises a thermoplastic fiber composite material and a local reduction in a thickness of the first plate is made by the material-removing processing of the first face;
    positioning a second plate relative to the first plate such that the first face of the first plate is brought into alignment with a third face of the second plate; and
    joining the first plate to the second plate to form a single component, wherein the surface of the first face of the first plate is integrally bonded to the surface of the third face of the second plate, wherein the step of joining the plates into a single component comprises a step of pressing and wherein a portion of the first plate processed in a material-removing manner is deformed and integrally bonded to the third face of the second plate during the pressing step.

2. The method of claim 1, wherein the first plate comprises at least one first fiber layer, some of which is removed during the material-removing processing.

3. The method of claim 1, wherein the first plate comprises a first cover layer which is arranged on a second face opposite the first face and remains intact during the material-removing processing.

4. The method of claim 1, wherein the first plate comprises a first cover layer which is arranged on a second face opposite the first face and remains intact during the joining process.

5. The method of claim 1, wherein the second plate comprises a thermoplastic fiber composite material and a second cover layer which is arranged on a fourth face opposite the third face.

6. The method of claim 1, wherein the first plate and the second plate are each provided with a plurality of fiber layers.

7. The method of claim 6, wherein the third face of the second plate is processed in a material-removing manner in order to locally reduce a thickness of the second plate prior to the positioning process.

8. The method of claim 7, wherein the thickness of the second plate is reduced symmetrically to the first plate.

9. The method of claim 8, wherein the fiber layers and the cover layers of the plates are deformed during the pressing process into an arrangement having symmetry, with respect to a center line of a component contour, at portions in which there is no transition region from a thickness change.

10. The method of claim 1, wherein the second plate is provided with a constant thickness.

11. A method for producing a thermoplastic fiber composite component, comprising the following method steps:
    material-removing processing of a first face of a first plate, wherein the first plate comprises a thermoplastic fiber composite material and a local reduction in a thickness of the first plate is made by the material-removing processing of the first face;
    positioning a second plate relative to the first plate such that the first face of the first plate is brought into alignment with a third face of the second plate, wherein the third face of the second plate is processed in a material-removing manner in order to locally reduce a thickness of the second plate prior to the positioning process, wherein the thickness of the second plate is reduced symmetrically to the first plate; and
    joining the first plate to the second plate to form a single component by pressing, wherein the surface of the first face of the first plate is integrally bonded to the surface of the third face of the second plate,
    wherein the first plate and the second plate are each provided with a plurality of fiber layers and wherein the fiber layers of the plates are deformed during the pressing process into an arrangement having symmetry, with respect to a center line of a component contour, at portions in which there is no transition region from a thickness change.

12. The method of claim 11, wherein the first plate comprises at least one first fiber layer, some of which is removed during the material-removing processing.

13. The method of claim 11, wherein the first plate comprises a first cover layer which is arranged on a second face opposite the first face and remains intact during the material-removing processing.

14. The method of claim 11, wherein the first plate comprises a first cover layer which is arranged on a second face opposite the first face and remains intact during the joining process.

15. The method of claim 11, wherein the second plate comprises a thermoplastic fiber composite material and a second cover layer which is arranged on a fourth face opposite the third face.

* * * * *